US012323858B2

(12) United States Patent
Kalhan et al.

(10) Patent No.: US 12,323,858 B2
(45) Date of Patent: Jun. 3, 2025

(54) CDMA BASED RESERVATION CHANNEL TRANSMISSION IN V2V COMMUNICATIONS

(71) Applicant: Kyocera Corporation, Kyoto (JP)

(72) Inventors: Amit Kalhan, San Diego, CA (US); Henry Chang, San Diego, CA (US)

(73) Assignee: KYOCERA CORPORATION, Kyoto (JP)

( * ) Notice: Subject to any disclaimer, the term of this patent is extended or adjusted under 35 U.S.C. 154(b) by 390 days.

(21) Appl. No.: 17/282,988

(22) PCT Filed: Oct. 9, 2019

(86) PCT No.: PCT/US2019/055361
§ 371 (c)(1),
(2) Date: Apr. 5, 2021

(87) PCT Pub. No.: WO2020/076924
PCT Pub. Date: Apr. 16, 2020

(65) Prior Publication Data
US 2021/0345183 A1    Nov. 4, 2021

Related U.S. Application Data

(60) Provisional application No. 62/748,960, filed on Oct. 22, 2018, provisional application No. 62/743,852, filed on Oct. 10, 2018.

(51) Int. Cl.
*H04W 28/26*     (2009.01)
*H04J 13/00*     (2011.01)
(Continued)

(52) U.S. Cl.
CPC ........... *H04W 28/26* (2013.01); *H04J 13/004* (2013.01); *H04W 4/46* (2018.02); *H04W 72/02* (2013.01);
(Continued)

(58) Field of Classification Search
CPC ....... H04W 28/26; H04W 4/46; H04W 72/02; H04W 72/0446; H04W 72/0453;
(Continued)

(56) References Cited

U.S. PATENT DOCUMENTS 5,737,324 A    4/1998  Dixon et al.
7,190,672 B1   3/2007  Whitehall
(Continued)

FOREIGN PATENT DOCUMENTS

JP    2004-297824 A    10/2004

OTHER PUBLICATIONS

Li et al., "Resource Management for 5G eV2X" U.S. Appl. No. 62/716,674, filed Aug. 9, 2018 (Year: 2018).*
(Continued)

*Primary Examiner* — Thinh D Tran (57) ABSTRACT

The examples set forth herein describe methods, devices, and systems in which a wireless communication device that is a node of a vehicle ad-hoc network (VANET) spreads a reservation channel message with a spreading code, according to a codedivision multiple access (CDMA) scheme. The wireless communication device transmits a reservation channel transmission to at least one other wireless communication device, which is another node of the VANET, via time-frequency resources selected from a reservation channel resource pool. The reservation channel transmission contains the spread reservation channel message. In some examples, multiple reservation channel messages may be included in a single reservation channel transmission. In these examples, each reservation channel message is spread with a different orthogonal code before combining the reservation channel messages and spreading the combined reservation channel messages with a spreading code, according to a CDMA scheme.

18 Claims, 8 Drawing Sheets

(51) Int. Cl.
*H04W 4/46* (2018.01)
*H04W 72/02* (2009.01)
*H04W 72/0446* (2023.01)
*H04W 72/0453* (2023.01)

(52) U.S. Cl.
CPC ... *H04W 72/0446* (2013.01); *H04W 72/0453* (2013.01)

(58) Field of Classification Search
CPC ..... H04W 84/18; H04W 92/18; H04J 13/004; H04J 13/0077; H04J 13/0048; H04B 1/692; H04B 1/707; H04B 1/713
See application file for complete search history.

(56) References Cited

U.S. PATENT DOCUMENTS

| | | | | |
|---|---|---|---|---|
| 2009/0122775 | A1* | 5/2009 | Haartsen | H04L 5/0016 375/E1.001 |
| 2016/0072546 | A1* | 3/2016 | Floch | H04L 27/2017 375/150 |
| 2017/0054540 | A1* | 2/2017 | Kim | H04L 5/0033 |
| 2018/0116007 | A1* | 4/2018 | Yasukawa | H04W 72/1263 |
| 2018/0138939 | A1* | 5/2018 | Robinson | H04B 1/707 |
| 2018/0242190 | A1* | 8/2018 | Khoryaev | H04W 28/0284 |
| 2019/0007974 | A1* | 1/2019 | Nguyen | H04W 4/44 |
| 2020/0014418 | A1* | 1/2020 | Yu | H04J 13/0003 |
| 2020/0022089 | A1* | 1/2020 | Guo | H04W 52/242 |
| 2020/0029318 | A1* | 1/2020 | Guo | H04W 4/40 |
| 2020/0029340 | A1* | 1/2020 | He | H04W 72/25 |
| 2020/0112949 | A1* | 4/2020 | Lin | H04W 4/40 |
| 2020/0178268 | A1* | 6/2020 | Duengen | H04W 74/004 |
| 2021/0219268 | A1* | 7/2021 | Li | H04W 72/20 |
| 2021/0385694 | A1* | 12/2021 | Freda | H04W 74/0816 |

OTHER PUBLICATIONS

He et al., "Method and Apparatus for resource allocation mechanism in NR V2X", U.S. Appl. No. 62/737,566, filed Sep. 27, 2018 (Year: 2018).*

Ericsson; "On Mode 2 Resource Allocation for NR Sidelink," R1-1811594; 3GPP TSG-RAN WG1 Meeting #94-Bis; Sep. 28, 2018; Chengdu, CN.

* cited by examiner

CDMA BASED RESERVATION CHANNEL TRANSMISSION IN V2V COMMUNICATIONS

CLAIM OF PRIORITY

The present application claims priority to Provisional Application No. 62/743,852, entitled "RESERVATION CHANNEL TRANSMISSION IN V2V COMMUNICATIONS", filed Oct. 10, 2018, and to Provisional Application No. 62/748,960, entitled "CDMA BASED RESERVATION CHANNEL TRANSMISSION IN V2V COMMUNICATIONS", filed Oct. 22, 2018, both of which are assigned to the assignee hereof and hereby expressly incorporated by reference in their entirety.

FIELD

This invention generally relates to wireless communications and more particularly to reservation channel transmissions between wireless communication devices.

BACKGROUND

A vehicle ad-hoc network (VANET) is an autonomously created wireless network of vehicles. In some VANETs, the wireless communication devices, which are located within the vehicles of the VANET, autonomously select the time-frequency resources for data transmissions to other vehicles within the VANET. However, if the number of transmitting vehicle-to-vehicle (V2V) devices is large with respect to the resources available for data transmissions, the probability of data transmission collisions is high.

SUMMARY

The examples set forth herein describe methods, devices, and systems in which a wireless communication device that is a node of a vehicle ad-hoc network (VANET) spreads a reservation channel message with a spreading code, according to a code-division multiple access (CDMA) scheme. The wireless communication device transmits a reservation channel transmission to at least one other wireless communication device, which is another node of the VANET, via time-frequency resources selected from a reservation channel resource pool. The reservation channel transmission contains the spread reservation channel message. In some examples, multiple reservation channel messages may be included in a single reservation channel transmission. In these examples, each reservation channel message is spread with a different orthogonal code before combining the reservation channel messages and spreading the combined reservation channel messages with a spreading code, according to a CDMA scheme.

DETAILED DESCRIPTION

The examples discussed below are generally directed to vehicle-to-vehicle (V2V) communication between two or more vehicles that are part of a vehicle ad-hoc network (VANET). However, any of the following examples may be applied to vehicle-to-everything (V2X) communication, which is the passing of information from a vehicle to any entity that may affect the vehicle or that the vehicle may affect. For example, V2X is a vehicular communication system that incorporates other, more specific types of communication, including V2V, V2I (vehicle-to-infrastructure), V2N (vehicle-to-network), V2P (vehicle-to-pedestrian), V2D (vehicle-to-device), and V2G (vehicle-to-grid). Some examples of V2X protocols include Long-Term Evolution (LTE) (Rel-14) V2X Mode 4 and 5G New Radio (NR) V2X Mode 2.

In order to minimize the number of data transmission collisions in a VANET, a wireless communication device interested in transmitting data transmits a reservation channel, which indicates resources to be used for the data transmission at a future time. The other wireless communication devices in the VANET receive and decode this reservation channel transmission in order to identify the resources that will be used by the transmitting wireless communication device for future data transmissions. In order to avoid collisions, the other wireless communication devices take the resources identified in the reservation channel transmission into account when selecting transmission resources that will be used for their respective future data transmissions.

In accordance with one example of a resource selection method, a wireless communication device that is interested in transmitting data uses long-term sensing to discover which resources are already periodically being used by one or more other wireless communication devices. When an actual data packet arrives at the wireless communication device, the wireless communication device uses short-term sensing to detect, among the remaining idle resources, an idle set of resources. The wireless communication device then transmits a reservation channel transmission to reserve resources, which were identified as being idle, for a future data transmission. However, such a methodology can, in some cases, be problematic since there are still potential problems with collisions of the reservation channel transmissions.

One method to avoid collisions between the reservation channel transmissions is to assign orthogonal resources. For example, in a time-division multiplexing (TDM) case, wireless communication device A and wireless communication device B transmit their reservation channel transmissions in time slots $t_A$ and $t_B$, respectively. However, the assignment of time slots to the wireless communication devices (1) requires additional signaling overhead, and (2) may not be efficient since such a system utilizes resources to transmit the reservation channel transmissions that could otherwise be used for data transmissions.

The examples set forth herein describe methods, devices, and systems in which a wireless communication device that is a node of a vehicle ad-hoc network (VANET) spreads a reservation channel message with a spreading code, according to a code-division multiple access (CDMA) scheme. The wireless communication device transmits a reservation channel transmission to at least one other wireless communication device, which is another node of the VANET, via time-frequency resources selected from a reservation channel resource pool. The reservation channel transmission contains the spread reservation channel message.

The network configures (e.g., allocates) time-frequency resources available to use for reservation channel transmissions within a reservation channel resource pool. In some cases, the time-frequency resources available to use for reservation channel transmissions are distributed periodically in a time-frequency domain. In other cases, the time-frequency resources available to use for reservation channel transmissions are distributed non-periodically in a time-frequency domain. For example, the time-frequency resources available to use for reservation channel transmissions could be distributed in a pre-determined manner (e.g., deterministically) within the time-frequency domain. Regardless of the type of distribution, the wireless communication devices are made aware of the distribution/location of the reservation channel resources so that the wireless communication devices can attempt to decode the reservation channel transmissions at the appropriate location (e.g., within the time-frequency domain).

In other examples, it is not necessary to pre-allocate the reservation channel resource pool since the wireless communication devices that wish to transmit reservation channel transmissions could use long-term sensing to select only those resources for the reservation channel transmissions that are not being used for data transmissions. Thus, in these examples, the receiving wireless communication devices assume the presence of a reservation channel transmission in every time-slot and attempt to detect a reservation channel transmission in each time-slot.

Figure 1:
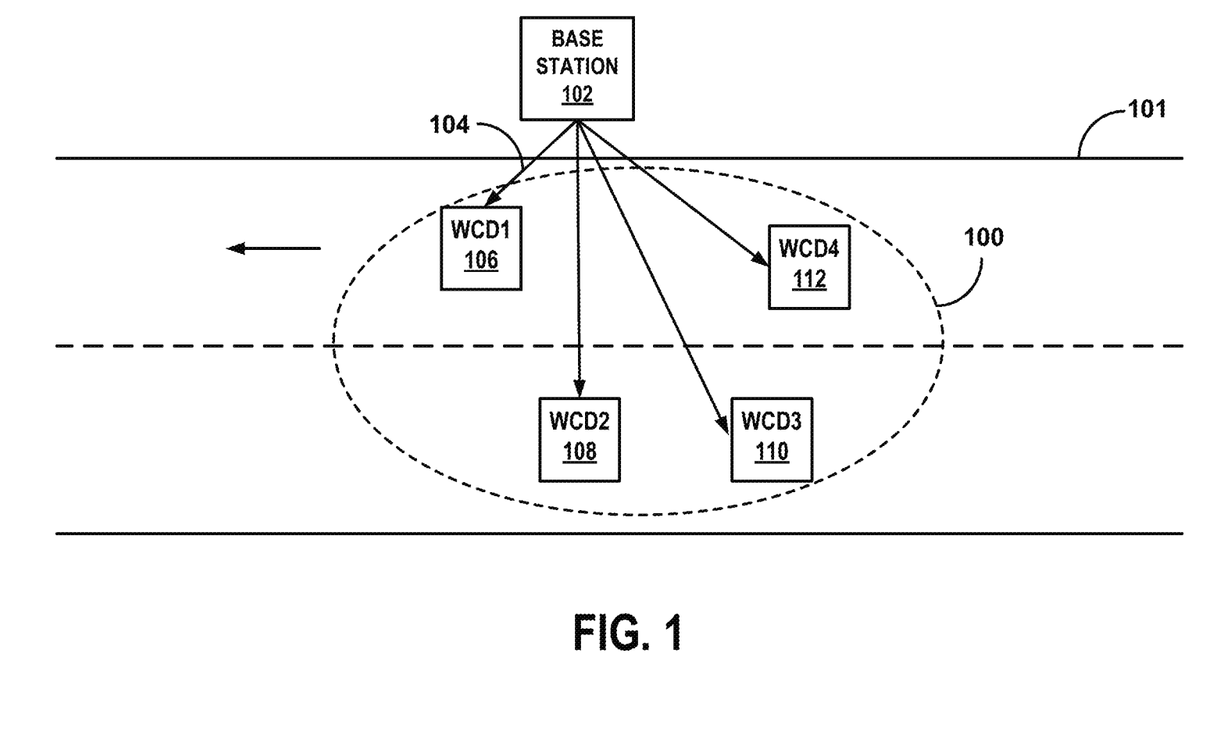
FIG. 1 is a block diagram of an example of a system in which a wireless communication device, which is a node of a vehicle ad-hoc network (VANET), receives broadcast information regarding a reservation channel resource pool and selects time-frequency resources to use for a reservation channel transmission to at least one other wireless communication device, which is another node of the VANET.

FIG. 1 is a block diagram of an example of a system in which a wireless communication device, which is a node of a vehicle ad-hoc network (VANET), receives broadcast information regarding a reservation channel resource pool and selects time-frequency resources to use for a reservation channel transmission to at least one other wireless communication device, which is another node of the VANET. For the example of FIG. 1, VANET 100 is located on roadway 101 and includes first wireless communication device, WCD1, 106, second wireless communication device, WCD2, 108, third wireless communication device, WCD3, 110, and fourth wireless communication device, WCD4, 112. In other examples, VANET 100 may have a different number of wireless communication devices than that shown in FIG. 1.

VANET 100 is wirelessly connected to a radio access network (not shown) via base station 102, which provides various wireless services to one or more of the wireless communication devices that are part of VANET 100. For the example shown in FIG. 1, VANET 100 operates in accordance with at least one revision of the 3rd Generation Partnership Project Long Term Evolution (3GPP LTE) communication specification. In other examples, VANET 100 may operate in accordance with other communication specifications.

In the interest of clarity and brevity, only one base station 102 is shown in FIG. 1. However, in other examples, any suitable number of base stations may be utilized by VANET 100 in order to obtain/maintain communication with the network. For the example shown in FIG. 1, base station 102, sometimes referred to as eNodeB or eNB, communicates with wireless communication devices 106, 108, 110, 112 via wireless communication link 104.

For the example shown in FIG. 1, wireless communication link 104 is shown as a broadcast downlink signal from base station 102 to wireless communication devices 106, 108, 110, 112. Wireless communication devices 106, 108, 110, 112 are also capable of transmitting uplink signals (not shown) to base station 102. In the example of FIG. 1, wireless communication devices 106, 108, 110, 112 are each integrated into a vehicle as an onboard unit (OBU). In other examples, wireless communication devices 106, 108, 110, 112 may simply be user equipment (UE) devices that are located within a vehicle. Some examples of user equipment devices include: a mobile phone, a transceiver modem, a personal digital assistant (PDA), or a tablet, for example. Each wireless communication device 106, 108, 110, 112 that is connected to VANET 100 is considered to be a node of VANET 100.

Figure 2A:
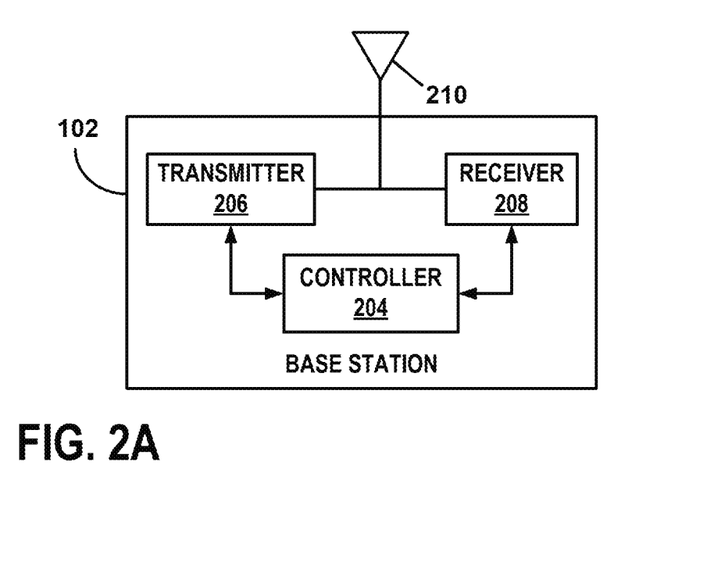
FIG. 2A is a block diagram of an example of the base station shown in FIG. 1.

Base station 102 is connected to the network through a backhaul (not shown) in accordance with known techniques. As shown in FIG. 2A, base station 102 comprises controller 204, transmitter 206, and receiver 208, as well as other electronics, hardware, and code. Base station 102 is any fixed, mobile, or portable equipment that performs the functions described herein. The various functions and operations of the blocks described with reference to base station 102 may be implemented in any number of devices, circuits, or elements. Two or more of the functional blocks may be integrated in a single device, and the functions described as performed in any single device may be implemented over several devices.

For the example shown in FIG. 2A, base station 102 may be a fixed device or apparatus that is installed at a particular location at the time of system deployment. Examples of such equipment include fixed base stations or fixed transceiver stations. In some situations, base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, base station 102 may be a portable device that is not fixed to any particular location. Accordingly, base station 102 may be a portable user device such as a UE device in some circumstances.

Controller 204 includes any combination of hardware, software, and/or firmware for executing the functions described herein as well as facilitating the overall functionality of base station 102. An example of a suitable controller 204 includes code running on a microprocessor or processor arrangement connected to memory. Transmitter 206 includes electronics configured to transmit wireless signals. In some situations, transmitter 206 may include multiple transmitters. Receiver 208 includes electronics configured to receive wireless signals. In some situations, receiver 208 may include multiple receivers. Receiver 208 and transmitter 206 receive and transmit signals, respectively, through antenna 210. Antenna 210 may include separate transmit and receive antennas. In some circumstances, antenna 210 may include multiple transmit and receive antennas.

Transmitter 206 and receiver 208 in the example of FIG. 2A perform radio frequency (RF) processing including modulation and demodulation. Receiver 208, therefore, may include components such as low noise amplifiers (LNAs) and filters. Transmitter 206 may include filters and amplifiers. Other components may include isolators, matching circuits, and other RF components. These components in combination or cooperation with other components perform the base station functions. The required components may depend on the particular functionality required by the base station.

Transmitter 206 includes a modulator (not shown), and receiver 208 includes a demodulator (not shown). The modulator modulates the signals to be transmitted as part of the downlink signal 104 and can apply any one of a plurality of modulation orders. The demodulator demodulates any uplink signals received at base station 102 in accordance with one of a plurality of modulation orders.

As mentioned above, base station 102 provides (1) various wireless services to one or more wireless communication devices 106, 108, 110, 112, (2) network connectivity to VANET 100, and (3) information regarding the reservation channel resource pool. In some examples, the information regarding the reservation channel resource pool is a configuration (e.g., allocation) of reservation channel resources within a reservation channel pool. In some cases, the time-frequency resources available to use for reservation channel transmissions are distributed periodically in a time-frequency domain. In other cases, the time-frequency resources available to use for reservation channel transmissions are distributed non-periodically in a time-frequency domain. For example, the time-frequency resources available to use for reservation channel transmissions can be distributed in a pre-determined manner (e.g., deterministically) within the time-frequency domain.

Figure 2B:
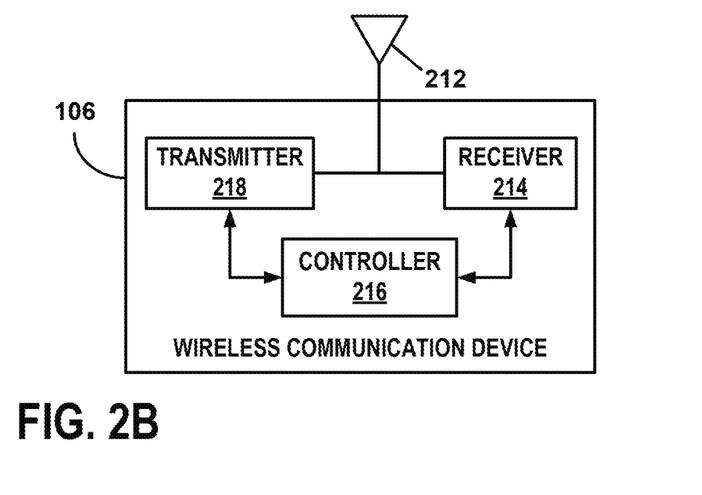
FIG. 2B is a block diagram of an example of a wireless communication device shown in FIG. 1.

As shown in FIG. 2B, wireless communication device 106 comprises controller 216, transmitter 218, and receiver 214, as well as other electronics, hardware, and code. Although FIG. 2B specifically depicts the circuitry and configuration of wireless communication device 106, the same wireless communication device circuitry and configuration is utilized for wireless communication devices 108, 110, 112 in VANET 100. Wireless communication device 106 is any fixed, mobile, or portable equipment that performs the functions described herein. The various functions and operations of the blocks described with reference to wireless communication device 106 may be implemented in any number of devices, circuits, or elements. Two or more of the functional blocks may be integrated in a single device, and the functions described as performed in any single device may be implemented over several devices.

Controller 216 includes any combination of hardware, software, and/or firmware for executing the functions described herein as well as facilitating the overall functionality of a wireless communication device. An example of a suitable controller 216 includes code running on a microprocessor or processor arrangement connected to memory. Transmitter 218 includes electronics configured to transmit wireless signals. In some situations, the transmitter 218 may include multiple transmitters. Receiver 214 includes electronics configured to receive wireless signals. In some situations, receiver 214 may include multiple receivers. Receiver 214 and transmitter 218 receive and transmit signals, respectively, through antenna 212. Antenna 212 may include separate transmit and receive antennas. In some circumstances, antenna 212 may include multiple transmit and receive antennas.

Transmitter 218 and receiver 214 in the example of FIG. 2B perform radio frequency (RF) processing including modulation and demodulation. Receiver 214, therefore, may include components such as low noise amplifiers (LNAs) and filters. Transmitter 218 may include filters and amplifiers. Other components may include isolators, matching circuits, and other RF components. These components in combination or cooperation with other components perform the wireless communication device functions. The required components may depend on the particular functionality required by the wireless communication device.

Transmitter 218 includes a modulator (not shown), and receiver 214 includes a demodulator (not shown). The modulator can apply any one of a plurality of modulation orders to modulate the signals to be transmitted as uplink signals (not shown). The demodulator demodulates the downlink signals 104 in accordance with one of a plurality of modulation orders.

In operation, base station 102 transmits, via transmitter 206 and antenna 210, broadcast downlink signal 104 to wireless communication devices 106, 108, 110, 112. In the example of FIG. 1, the downlink signal 104 is transmitted in a System Information Block (SIB) message that is broadcast to all wireless communication devices 106, 108, 110, 112 that are nodes of VANET 100. Downlink signal 104 contains information regarding the reservation channel resource pool, which has been configured by the network of which base station 102 is a part. In some examples, the information regarding the reservation channel resource pool is a configuration (e.g., allocation) of reservation channel resources within a reservation channel pool. In some cases, the time-frequency resources available to use for reservation channel transmissions are distributed periodically in a time-frequency domain. In other cases, the time-frequency resources available to use for reservation channel transmissions are distributed non-periodically in a time-frequency domain. For example, the time-frequency resources available to use for reservation channel transmissions can be distributed in a pre-determined manner (e.g., deterministically) within the time-frequency domain.

Figure 3:
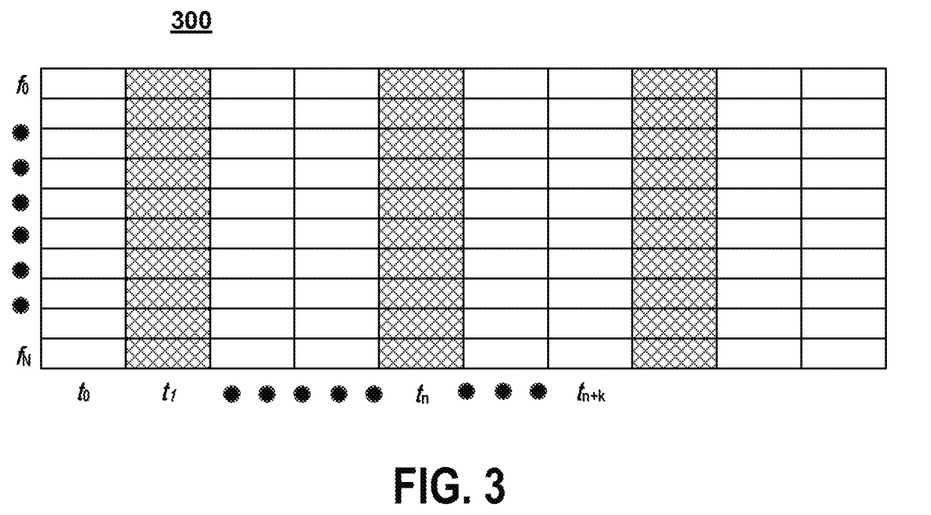
FIG. 3 is a diagram of an example in which the time-frequency resources available to use for reservation channel transmissions are distributed periodically in a time-frequency domain.

FIG. 3 is a diagram of an example in which the time-frequency resources available to use for reservation channel transmissions are distributed periodically in a time-frequency domain. For the example shown in FIG. 3, time-frequency domain 300 is provided where time, t, is represented on the horizontal axis and frequency, f, is represented on the vertical axis. Each box in the 10×10 grid of time-frequency domain 300 represents a time-slot that has both a corresponding time and frequency. Each of the time-slots of time-frequency domain 300 may be allocated by the network to be utilized as resources for data transmissions or resources for reservation channel transmissions.

In the example shown in FIG. 3, the network has configured (e.g., allocated) 3 columns of time-slots, which are distributed periodically in time-frequency domain 300 and are filled in with cross-hatching, to be utilized in VANET 100 for reservation channel transmissions. Although a particular periodic distribution of allocated time-slots has been shown in the example of FIG. 3, any other suitable periodic distribution and/or number of allocated time-slots may be used, in other examples. Regardless of the particular distribution and number of allocated time-slots, base station 102 transmits, to one or more wireless communication devices 106, 108, 110, 112, information regarding this periodic distribution of time-frequency resources that are available to use for reservation channel transmissions.

Figure 4:
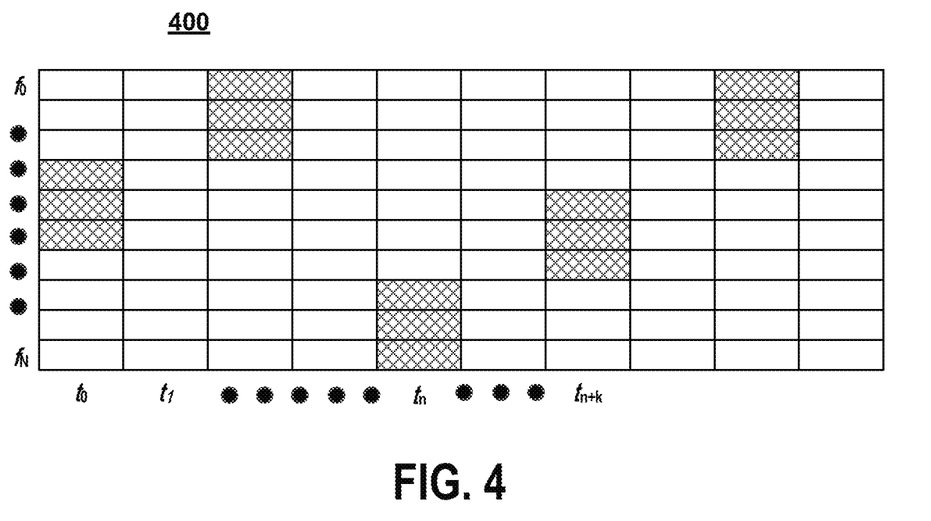
FIG. 4 is a diagram of an example in which the time-frequency resources available to use for reservation channel transmissions are distributed in a pre-determined manner within the time-frequency domain.

In other cases, the time-frequency resources available to use for reservation channel transmissions are distributed non-periodically in a time-frequency domain. FIG. 4 is a diagram of an example in which the time-frequency resources available to use for reservation channel transmissions are distributed in a non-periodic, pre-determined manner within the time-frequency domain. For the example shown in FIG. 4, time-frequency domain 400 is provided where time, t, is represented on the horizontal axis and frequency, f, is represented on the vertical axis. Each box in the 10×10 grid of time-frequency domain 400 represents a time-slot that has both a corresponding time and frequency. Each of the time-slots of time-frequency domain 400 may be allocated by the network to be utilized as resources for data transmissions or resources for reservation channel transmissions.

In the example shown in FIG. 4, the network has utilized a pre-determined algorithm or formula to configure (e.g., allocate) 5 groups of time-slots, which are distributed non-periodically in time-frequency domain 400 and are filled in with cross-hatching, to be utilized in VANET 100 for reservation channel transmissions. Although a particular distribution and number of allocated time-slots has been shown in the example of FIG. 4, any other suitable distribution and number of allocated time-slots may be used, in other examples. In still other cases, the allocated time-slots for reservation channel transmissions are uniformly distributed within time-frequency domain 400. Base station 102 transmits, to one or more wireless communication devices 106, 108, 110, 112, information regarding the non-periodic distribution of time-frequency resources that are available to use for reservation channel transmissions.

Figure 5:
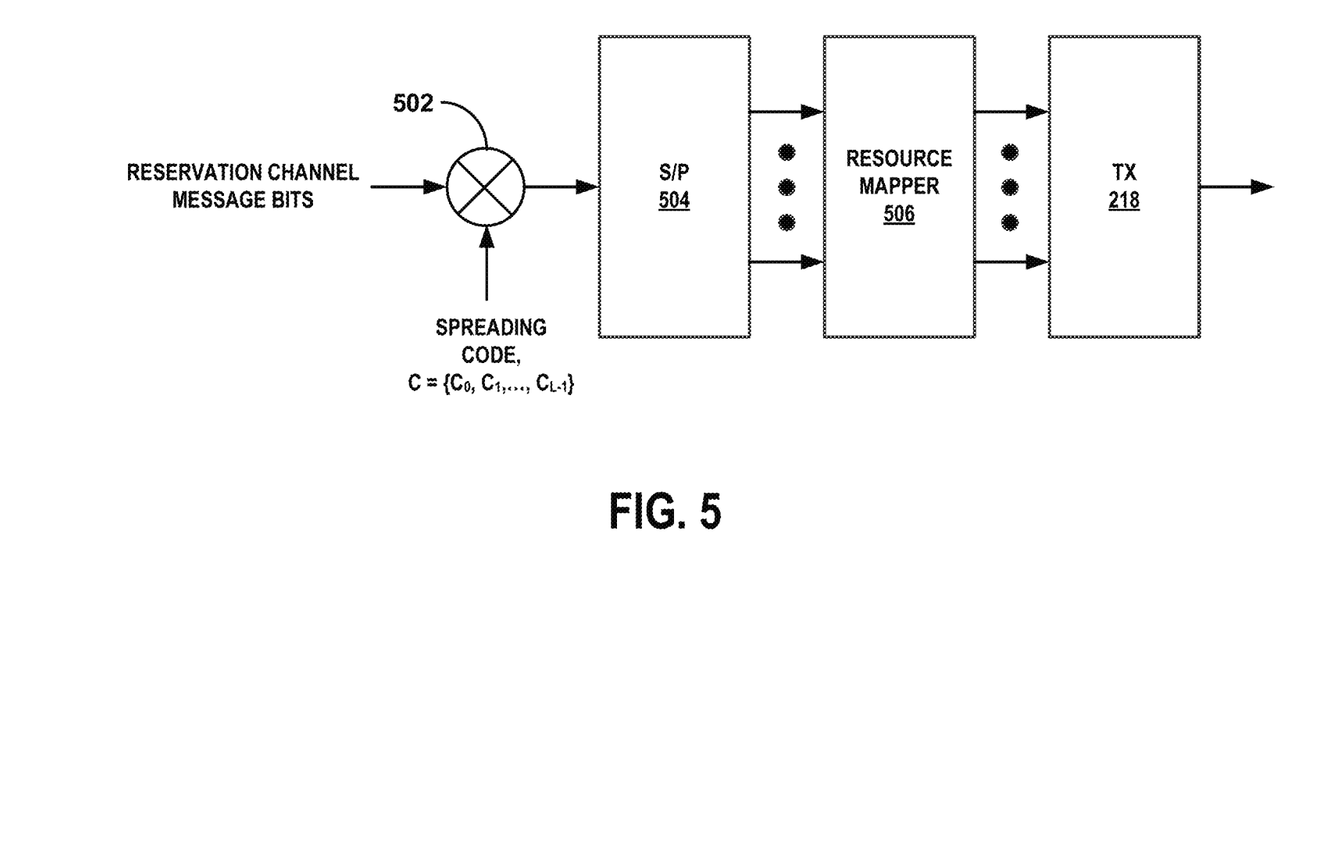
FIG. 5 is a block diagram of an example of a CDMA based reservation channel transmitter.

Returning to FIG. 1, wireless communication devices 106, 108, 110, 112 each receive downlink signal 104 via their respective antennas 212 and receivers 214. Based on the information regarding the reservation channel resource pool received via signal 104, wireless communication device 106 selects, from the reservation channel resource pool, time-frequency resources that will be used for a reservation channel transmission. FIG. 5 illustrates one example of how the selected time-frequency resources are involved in generating the reservation channel transmission.

FIG. 5 is a block diagram of an example of a CDMA based reservation channel transmitter. Controller 216 of wireless communication device 106 performs the functionality of the blocks of FIG. 5, unless otherwise indicated. However, in other examples, other circuitry may be utilized to perform one or more of the functions shown in FIG. 5.

In operation, controller 216 of wireless communication device 106 generates a reservation channel message that identifies which time-frequency resources wireless communication device 106 would like to reserve for one or more future data transmissions. As shown in the example of FIG. 5, the reservation channel message is spread with a spreading code, according to a code-division multiple access (CDMA) scheme. In the example shown in FIG. 5, the CDMA scheme is one of the following: a direct-spread CDMA (DS-CDMA) scheme, a multicarrier CDMA (MC-CDMA) scheme, and a frequency-hopping CDMA (FH-CDMA) scheme. In other examples, any other suitable CDMA schemes may be utilized.

Regardless of which CDMA scheme is utilized, a spreading code, C, of length, L, is applied in the frequency-domain to the reservation channel message bits, via combiner 502. In some examples, the spreading code is a function of at least one of the following: a transmitting device identifier, and an intended receiving device identifier. The transmitting device identifier identifies the transmitting wireless communication device 106. The intended receiving device identifier identifies one or more receiving wireless communication devices 108, 110, 112 for which the reservation channel transmission is intended.

After the reservation channel message is spread, the spread reservation channel message undergoes parallel-to-serial conversion 504 and is mapped 506 to the time-frequency resources that were selected for the reservation channel transmission. Wireless communication device 106 then transmits, to at least one other wireless communication device 108, the reservation channel transmission using the time-frequency resources selected from the reservation channel resource pool. The reservation channel transmission contains the spread reservation channel message. Wireless communication device 106 transmits the reservation channel transmission via its transmitter 218 and antenna 212. Wireless communication device 108 receives the reservation channel transmission via its antenna 212 and receiver 214. Wireless communication device 108 de-spreads and then decodes the reservation channel transmission in order to retrieve the reservation channel message, which conveys the reserved time-frequency location of one or more upcoming data transmissions from wireless communication device 106.

The example shown in FIG. 5 illustrates spreading the reservation channel message before the Inverse Fast Fourier Transform (IFFT) process such that overall transmitter structure can be implemented by concatenating a direct-spread CDMA spreader and an orthogonal frequency-division multiplexing (OFDM) transmitter. However, any other suitable transmitter architecture may be used.

In some examples, the reservation channel transmission includes one or more of the following: a transmitting device identifier, an intended receiving device identifier, resource location information associated with a future data transmission, and a size of the future data transmission. The transmitting device identifier identifies the transmitting wireless communication device 106. The intended receiving device identifier identifies one or more receiving wireless communication devices 108, 110, 112 for which the reservation channel transmission is intended. The resource location information indicates the time-frequency location, within a time-frequency domain, of a future data transmission that will be transmitted by the transmitting wireless communication device 106.

In some examples, after wireless communication device 106 acquires a reserved time-slot for data transmissions, wireless communication device 106 transmits a plurality of data transmissions via the reserved time-slot. For example, after reserving a time-slot, wireless communication device 106 can decide to continue holding the same reserved time-slot for future data transmissions and does not need to transmit another reservation channel transmission for those subsequent data transmissions.

As described above, wireless communication devices 108, 110, 112 are informed of the distribution/location of the reservation channel resources so that wireless communication devices 108, 110, 112 can attempt to decode the reservation channel transmissions from wireless communication device 106 at the appropriate location (e.g., within the time-frequency domain). In other examples, it is not necessary to pre-allocate the reservation channel resource pool since the wireless communication device 106 that wishes to transmit reservation channel transmissions could use long-term sensing to select only those resources for the reservation channel transmissions that are not being used for data transmissions. Thus, in these examples, the receiving wireless communication devices 108, 110, 112 assume the presence of a reservation channel transmission in every time-slot and attempt to detect a reservation channel transmission in each time-slot.

Although the foregoing description focused on wireless communication device 106 as transmitting the reservation channel transmission (e.g., the transmitting wireless communication device) and wireless communication devices 108, 110, 112 as receiving the reservation channel transmission (e.g., the receiving wireless communication devices), wireless communication devices 108, 110, 112 are also capable of transmitting their own respective reservation channel transmissions.

Figure 6:
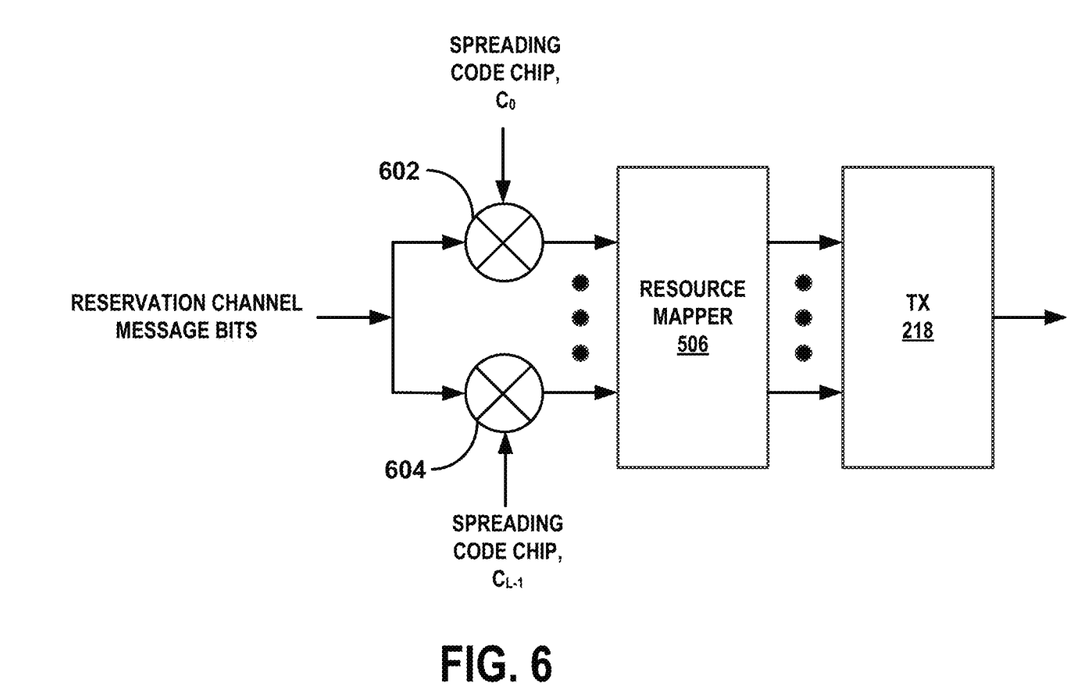
FIG. 6 is a block diagram of an alternative example of a CDMA based reservation channel transmitter.

FIG. 6 is a block diagram of an alternative example of a CDMA based reservation channel transmitter. Controller 216 of wireless communication device 106 performs the functionality of the blocks of FIG. 6, unless otherwise indicated. However, in other examples, other circuitry may be utilized to perform one or more of the functions shown in FIG. 6.

In operation, controller 216 of wireless communication device 106 generates a reservation channel message that identifies which time-frequency resources wireless communication device 106 would like to reserve for one or more future data transmissions. As shown in the example of FIG. 6, the reservation channel message is spread with a spreading code, according to a code-division multiple access (CDMA) scheme. In the example shown in FIG. 6, the CDMA scheme is one of the following: a direct-spread CDMA (DS-CDMA) scheme, a multicarrier CDMA (MC-CDMA) scheme, and a frequency-hopping CDMA (FH-CDMA) scheme. In other examples, any other suitable CDMA schemes may be utilized.

The example shown in FIG. 6 is different than the example shown in FIG. 5 in that the spreading code in FIG. 6 is applied directly to the identical parallel input bits of the reservation channel message. More specifically, each chip of the spreading code, C, of length, L, is applied directly to the identical parallel input bits of the reservation channel message, via a series of combiners, 602, 604. Although only two combiners are shown in FIG. 5, any suitable number of combiners may be utilized, based on the length, L, of the spreading code and/or the size of the reservation channel message. The spreading code, C, for the example of FIG. 6 is in the frequency domain and may or may not be the same spreading code as in the time domain. The implementation of FIG. 6 avoids high-speed processing, resulting in less complex hardware.

In some examples, the spreading code is a function of at least one of the following: a transmitting device identifier, and an intended receiving device identifier. The transmitting device identifier identifies the transmitting wireless communication device 106. The intended receiving device identifier identifies one or more receiving wireless communication devices 108, 110, 112 for which the reservation channel transmission is intended.

The outputs from the series of combiners 602, 604 are provided to resource mapper 506 to be mapped to the time-frequency resources that were selected for the reservation channel transmission. Wireless communication device 106 then transmits, to at least one other wireless communication device 108, the reservation channel transmission using the time-frequency resources selected from the reservation channel resource pool. The reservation channel transmission contains the spread reservation channel message. Wireless communication device 106 transmits the reservation channel transmission via its transmitter 218 and antenna 212. Wireless communication device 108 receives the reservation channel transmission via its antenna 212 and receiver 214. Wireless communication device 108 de-spreads and then decodes the reservation channel transmission in order to retrieve the reservation channel message, which conveys the reserved time-frequency location of one or more upcoming data transmissions from wireless communication device 106.

In some examples, the reservation channel transmission includes one or more of the following: a transmitting device identifier, an intended receiving device identifier, resource location information associated with a future data transmission, and a size of the future data transmission. The transmitting device identifier identifies the transmitting wireless communication device 106. The intended receiving device identifier identifies one or more receiving wireless communication devices 108, 110, 112 for which the reservation channel transmission is intended. The resource location information indicates the time-frequency location, within a time-frequency domain, of a future data transmission that will be transmitted by the transmitting wireless communication device 106.

In some examples, after wireless communication device 106 acquires a reserved time-slot for data transmissions, wireless communication device 106 transmits a plurality of data transmissions via the reserved time-slot. For example, after reserving a time-slot, wireless communication device 106 can decide to continue holding the same reserved time-slot for future data transmissions and does not need to transmit another reservation channel transmission for those subsequent data transmissions.

As described above, wireless communication devices 108, 110, 112 are informed of the distribution/location of the reservation channel resources so that wireless communication devices 108, 110, 112 can attempt to decode the reservation channel transmissions from wireless communication device 106 at the appropriate location (e.g., within the time-frequency domain). In other examples, it is not necessary to pre-allocate the reservation channel resource pool since the wireless communication device 106 that wishes to transmit reservation channel transmissions could use long-term sensing to select only those resources for the reservation channel transmissions that are not being used for data transmissions. Thus, in these examples, the receiving wireless communication devices 108, 110, 112 assume the presence of a reservation channel transmission in every time-slot and attempt to detect a reservation channel transmission in each time-slot.

Although the foregoing description focused on wireless communication device 106 as transmitting the reservation channel transmission (e.g., the transmitting wireless communication device) and wireless communication devices 108, 110, 112 as receiving the reservation channel transmission (e.g., the receiving wireless communication devices), wireless communication devices 108, 110, 112 are also capable of transmitting their own respective reservation channel transmissions.

Figure 7:
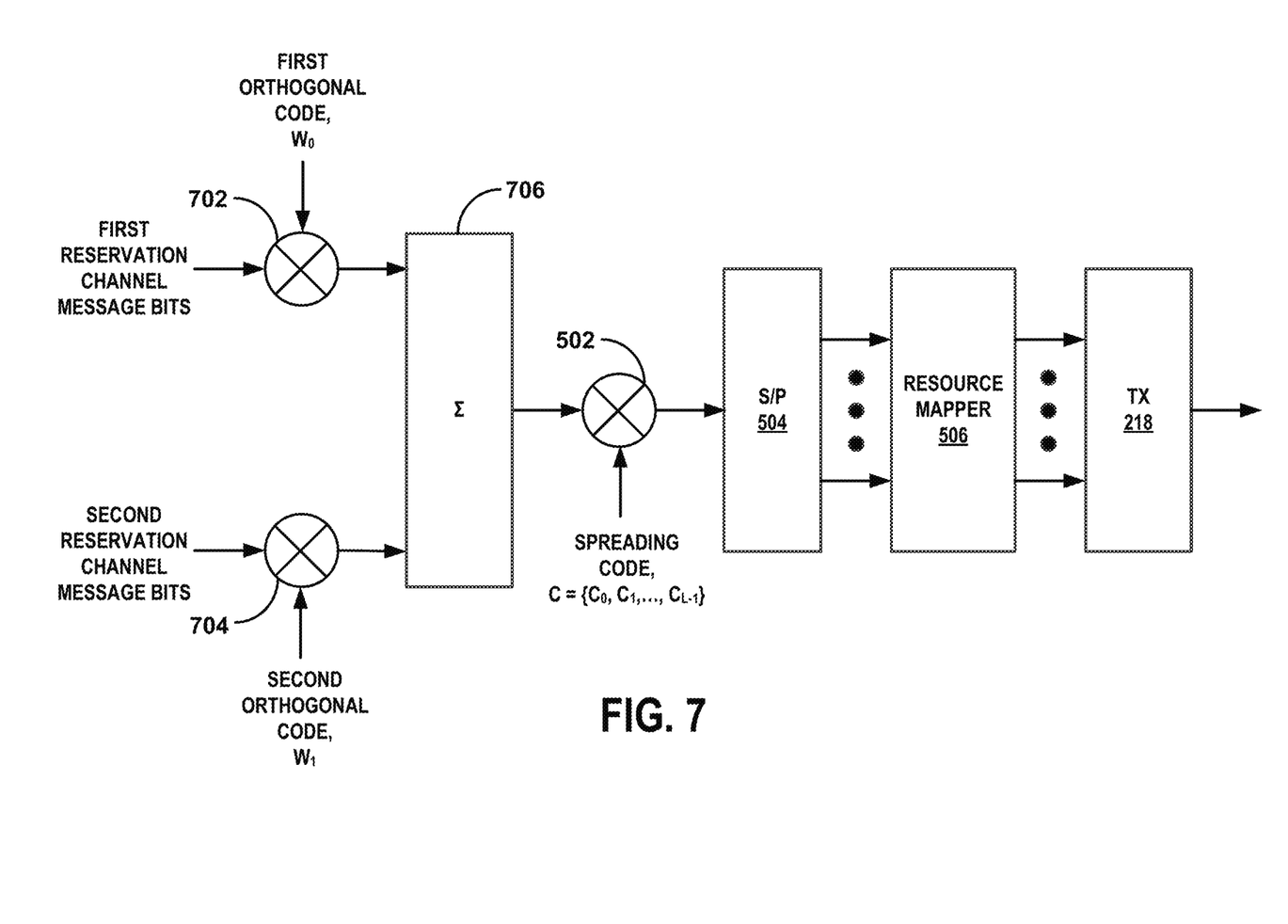
FIG. 7 is a block diagram of an example of a CDMA based reservation channel transmitter configured to transmit multiple reservation messages with a single reservation channel transmission.

FIG. 7 is a block diagram of an example of a CDMA based reservation channel transmitter configured to transmit multiple reservation messages with a single reservation channel transmission. Controller 216 of wireless communication device 106 performs the functionality of the blocks of FIG. 7, unless otherwise indicated. However, in other examples, other circuitry may be utilized to perform one or more of the functions shown in FIG. 7. For the sake of simplicity, FIG. 7 is shown as only transmitting two reservation channel messages within a reservation channel transmission. In other examples, the architecture of the example of FIG. 7 may be modified to accommodate any suitable number of reservation channel messages within the reservation channel transmission.

In operation, controller 216 of wireless communication device 106 generates a first reservation channel message that identifies a first set of time-frequency resources wireless communication device 106 would like to reserve for one or more future data transmissions. Controller 216 of wireless communication device 106 also generates a second reservation channel message that identifies a second set of time-frequency resources wireless communication device 106 would like to reserve for one or more future data transmissions.

Controller 216 spreads the first reservation channel message with a first orthogonal code (e.g., Walsh code), $W_0$, via combiner 702, to generate an orthogonal spread first reservation channel message. Controller 216 spreads the second reservation channel message with a second orthogonal code (e.g., Walsh code), $W_1$, via combiner 704, to generate an orthogonal spread second reservation channel message. Controller 216 combines the orthogonal spread first reservation channel message and the orthogonal spread second reservation channel message, via summing function 706.

The combined orthogonal spread first reservation channel message and orthogonal spread second reservation channel message (e.g., combined reservation channel message) is spread with a spreading code, according to a code-division multiple access (CDMA) scheme. In the example shown in FIG. 7, the CDMA scheme is one of the following: a direct-spread CDMA (DS-CDMA) scheme, a multicarrier CDMA (MC-CDMA) scheme, and a frequency-hopping CDMA (FH-CDMA) scheme. In other examples, any other suitable CDMA schemes may be utilized.

Regardless of which CDMA scheme is utilized, a spreading code, C, of length, L, is applied in the frequency-domain to the combined reservation channel message, via combiner 502. In some examples, the spreading code is a function of at least one of the following: a transmitting device identifier, and an intended receiving device identifier. The transmitting device identifier identifies the transmitting wireless communication device 106. The intended receiving device identifier identifies one or more receiving wireless communication devices 108, 110, 112 for which the reservation channel transmission is intended.

After the combined reservation channel message is spread, the spread combined reservation channel message undergoes parallel-to-serial conversion 504 and is mapped 506 to the time-frequency resources that were selected for the reservation channel transmission. Wireless communication device 106 then transmits, to at least one other wireless communication device 108, the reservation channel transmission using the time-frequency resources selected from the reservation channel resource pool. The reservation channel transmission contains the spread combined reservation channel message. Wireless communication device 106 transmits the reservation channel transmission via its transmitter 218 and antenna 212. Wireless communication device 108 receives the reservation channel transmission via its antenna 212 and receiver 214. Wireless communication device 108 de-spreads the reservation channel transmission and then performs an orthogonal code de-spreading in order to retrieve the first reservation channel message, which conveys a first set of time-frequency resources reserved for one or more upcoming data transmissions from wireless communication device 106, and the second reservation channel message, which conveys a second set of time-frequency resources reserved for one or more upcoming data transmissions from wireless communication device 106.

In some examples, the reservation channel transmission in FIG. 7 includes one or more of the following: a transmitting device identifier, an intended receiving device identifier, resource location information associated with a future data transmission, and a size of the future data transmission. The transmitting device identifier identifies the transmitting wireless communication device 106. The intended receiving device identifier identifies one or more receiving wireless communication devices 108, 110, 112 for which the reservation channel transmission is intended. The resource location information indicates the time-frequency location, within a time-frequency domain, of a future data transmission that will be transmitted by the transmitting wireless communication device 106.

In some examples, after wireless communication device 106 acquires a reserved time-slot for data transmissions, wireless communication device 106 transmits a plurality of data transmissions via the reserved time-slot. For example, after reserving a time-slot, wireless communication device 106 can decide to continue holding the same reserved time-slot for future data transmissions and does not need to transmit another reservation channel transmission for those subsequent data transmissions.

As described above, wireless communication devices 108, 110, 112 are informed of the distribution/location of the reservation channel resources so that wireless communication devices 108, 110, 112 can attempt to decode the reservation channel transmissions from wireless communication device 106 at the appropriate location (e.g., within the time-frequency domain). In other examples, it is not necessary to pre-allocate the reservation channel resource pool since the wireless communication device 106 that wishes to transmit reservation channel transmissions could use long-term sensing to select only those resources for the reservation channel transmissions that are not being used for data transmissions. Thus, in these examples, the receiving wireless communication devices 108, 110, 112 assume the presence of a reservation channel transmission in every time-slot and attempt to detect a reservation channel transmission in each time-slot.

Although the foregoing description focused on wireless communication device 106 as transmitting the reservation channel transmission (e.g., the transmitting wireless communication device) and wireless communication devices 108, 110, 112 as receiving the reservation channel transmission (e.g., the receiving wireless communication devices), wireless communication devices 108, 110, 112 are also capable of transmitting their own respective reservation channel transmissions.

Figure 8:
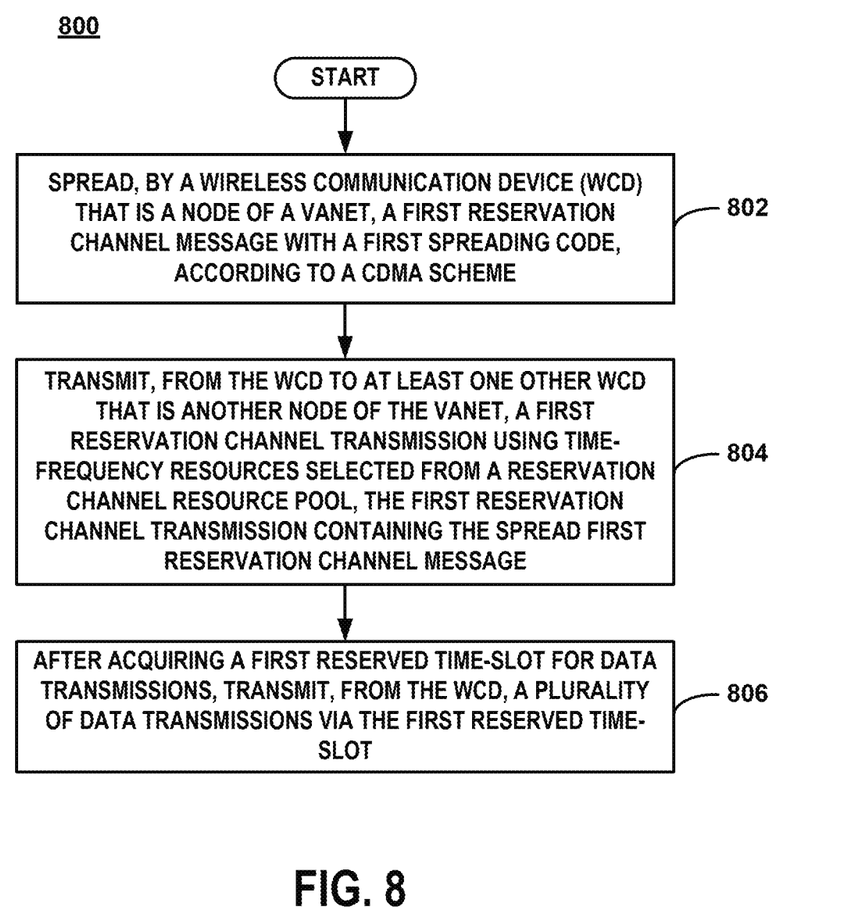
FIG. 8 is a flowchart of an example of a method in which a wireless communication device spreads a reservation channel message with a spreading code and transmits, to at least one other wireless communication device, a reservation channel transmission containing the spread reservation channel message.

FIG. 8 is a flowchart of an example of a method in which a wireless communication device spreads a reservation channel message with a spreading code and transmits, to at least one other wireless communication device, a reservation channel transmission containing the spread reservation channel message. The method 800 begins at step 802 with spreading, by wireless communication device 106, which is a node of VANET 100, a first reservation channel message with a first spreading code, according to a CDMA scheme. At step 804, wireless communication device 106 transmits, to at least one other wireless communication device 108, which is another node of VANET 100, a first reservation channel transmission using time-frequency resources selected from a reservation channel resource pool. The first reservation channel transmission contains the spread first reservation channel message. At step 806, after acquiring a first reserved time-slot for data transmissions, wireless communication device 106 transmits a plurality of data transmissions via the first reserved time-slot. In other examples, one or more of the steps of method 800 may be omitted, combined, performed in parallel, or performed in a different order than that described herein or shown in FIG. 8. In still further examples, additional steps may be added to method 800 that are not explicitly described in connection with the example shown in FIG. 8.

Figure 9:
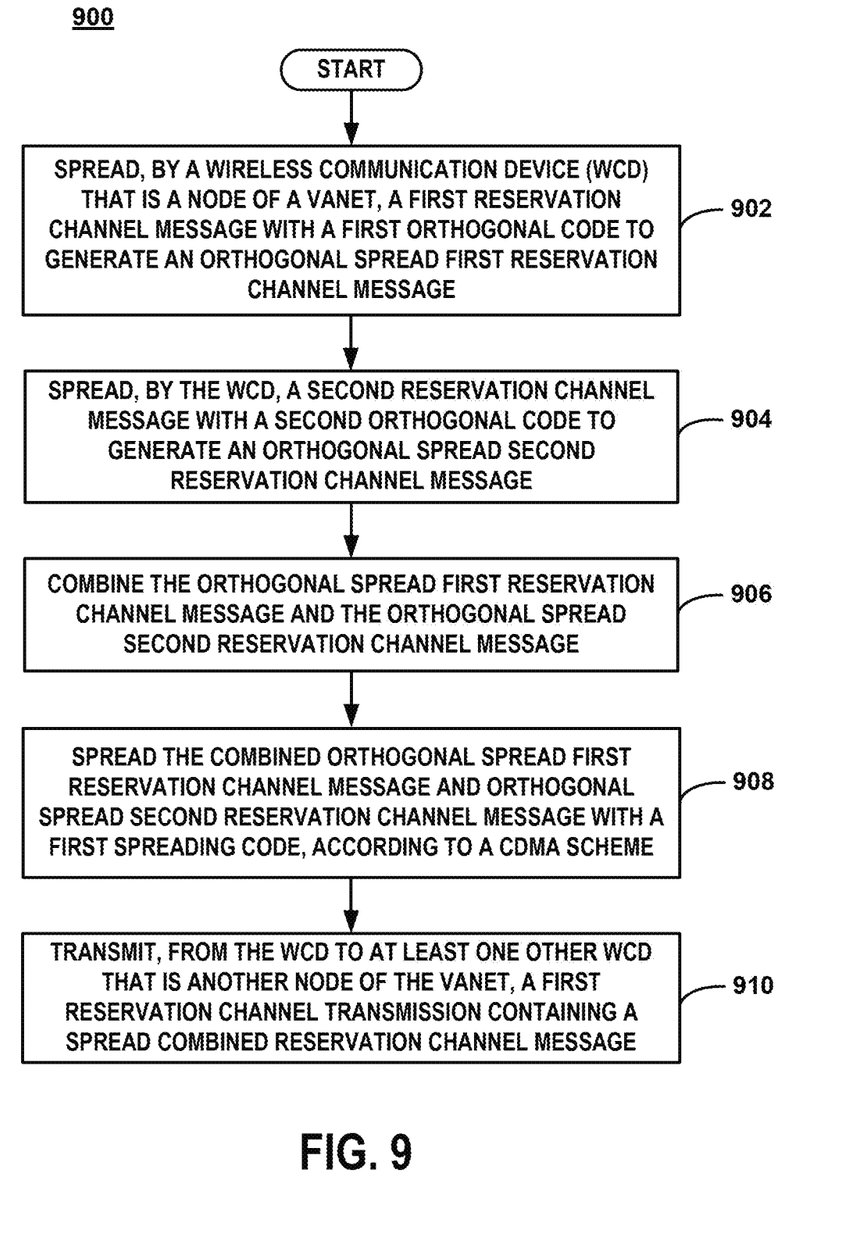
FIG. 9 is a flowchart of an example of a method in which a wireless communication device spreads first and second reservation channel messages with first and second orthogonal codes, respectively, before combining and transmitting the first and second reservation channel messages in a single reservation channel transmission.

FIG. 9 is a flowchart of an example of a method in which a wireless communication device spreads first and second reservation channel messages with first and second orthogonal codes, respectively, before combining and transmitting the first and second reservation channel messages in a single reservation channel transmission. The method 900 begins at step 902 with spreading, by wireless communication device 106, which is a node of VANET 100, a first reservation channel message with a first orthogonal code to generate an orthogonal spread first reservation channel message. At step 904, wireless communication device 106 spreads a second reservation channel message with a second orthogonal code to generate an orthogonal spread second reservation channel message. At step 906, wireless communication device 106 combines the orthogonal spread first reservation channel message and the orthogonal spread second reservation channel message to generate a combined reservation channel message. At step 908, wireless communication device 106 spreads the combined reservation channel message with a first spreading code, according to a CDMA scheme. At step 910, wireless communication device 106 transmits, to at least one other wireless communication device 108, which is another node of VANET 100, a first reservation channel transmission that contains the spread combined reservation channel message. In other examples, one or more of the steps of method 900 may be omitted, combined, performed in parallel, or performed in a different order than that described herein or shown in FIG. 9. In still further examples, additional steps may be added to method 900 that are not explicitly described in connection with the example shown in FIG. 9.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
spreading, by a wireless communication device that is a transmitter node of a vehicle ad-hoc network (VANET), a first reservation channel message with a first orthogonal code to generate an orthogonal spread first reservation channel message, the first reservation channel message identifying a first set of time-frequency resources being reserved for an upcoming data transmission from the wireless communication device to a target wireless communication device that is a target node in the VANET;
spreading, by the wireless communication device, a second reservation channel message with a second orthogonal code to generate an orthogonal spread second reservation channel message, the second reservation channel message identifying a second set of time-frequency resources being reserved for another upcoming data transmission from the wireless communication device to another target wireless communication device that is another target node in the VANET;
combining the orthogonal spread first reservation channel message and the orthogonal spread second reservation channel message;
spreading, by the wireless communication device, the combined orthogonal spread first reservation channel message and orthogonal spread second reservation channel message with a first spreading code, according to a code-division multiple access (CDMA) scheme, to generate a spread combined reservation channel message; and
transmitting, from the wireless communication device to at least one other wireless communication device that is another node of the VANET, a first reservation channel transmission using time-frequency resources selected from a reservation channel resource pool, the time-frequency resources allocated by a network for reservation channel transmissions for reserving data time-frequency resources for data transmissions, the first reservation channel transmission containing the spread combined reservation channel message, which contains the orthogonal spread first reservation channel message and the orthogonal spread second reservation channel message, the orthogonal spread first reservation channel message indicating to the at least one other wireless communication device that the first set of time-frequency resources are being reserved for the upcoming data transmission from the wireless communication device to the target wireless communication device, the orthogonal spread second reservation channel message indicating to the at least one other wireless communication device that the second set of time-frequency resources are being reserved for the another upcoming data transmission from the wireless communication device to the another target wireless communication device.

2. The method of claim 1, wherein the time-frequency resources available to use for reservation channel transmissions are distributed periodically in a time-frequency domain.

3. The method of claim 1, wherein the time-frequency resources available to use for reservation channel transmissions are distributed non-periodically in a time-frequency domain.

4. The method of claim 3, wherein the time-frequency resources available to use for reservation channel transmissions are distributed deterministically within the time-frequency domain.

5. The method of claim 1, wherein the first reservation channel transmission comprises at least one of the following: a transmitting device identifier, an intended receiving device identifier, resource location information associated with a future data transmission, and a size of the future data transmission.

6. The method of claim 1, wherein the CDMA scheme is one of the following: a direct-spread CDMA (DS-CDMA) scheme, a multicarrier CDMA (MC-CDMA) scheme, and a frequency-hopping CDMA (FH-CDMA) scheme.

7. The method of claim 1, wherein the first spreading code is a function of at least one of the following: a transmitting device identifier, and an intended receiving device identifier.

8. The method of claim 1, further comprising:
after acquiring a first reserved time-slot for data transmissions, transmitting, from the wireless communication device, a plurality of data transmissions via the first reserved time-slot.

9. The method of claim 1, further comprising:
receiving, from the network, a signal containing information regarding a configuration of reservation channel resources within the reservation channel resource pool.

10. A wireless communication device that is a node of a vehicle ad-hoc network (VANET), the wireless communication device comprising:
a controller configured to:
spread a first reservation channel message with a first orthogonal code to generate an orthogonal spread first reservation channel message, the first reservation channel message identifying a first set of time-frequency resources being reserved for an upcoming data transmission from the wireless communication device to a target wireless communication device that is a target node in the VANET,
spread a second reservation channel message with a second orthogonal code to generate an orthogonal spread second reservation channel message, the second reservation channel message identifying a second set of time-frequency resources being reserved for another upcoming data transmission from the wireless communication device to another target wireless communication device that is another target node in the VANET,
combine the orthogonal spread first reservation channel message and the orthogonal spread second reservation channel message, and
spread the combined orthogonal spread first reservation channel message and orthogonal spread second reservation channel message with a first spreading code, according to a code-division multiple access (CDMA) scheme, to generate a spread combined reservation channel message; and
a transmitter configured to transmit, to at least one other wireless communication device that is another node of the VANET, a first reservation channel transmission using time-frequency resources selected from a reservation channel resource pool, the time-frequency resources allocated by a network for reservation channel transmissions for reserving data time-frequency resources for data transmissions, the first reservation channel transmission containing the spread combined reservation channel message, which contains the orthogonal spread first reservation channel message and the orthogonal spread second reservation channel message, the orthogonal spread first reservation channel message indicating to the at least one other wireless communication device that the first set of time-frequency resources are being reserved for the upcoming data transmission from the wireless communication device to the target wireless communication device, the orthogonal spread second reservation channel message indicating to the at least one other wireless communication device that the second set of time-frequency resources are being reserved for the another upcoming data transmission from the wireless communication device to the another target wireless communication device.

11. The wireless communication device of claim 10, wherein the time-frequency resources available to use for reservation channel transmissions are distributed periodically in a time-frequency domain.

12. The wireless communication device of claim 10, wherein the time-frequency resources available to use for reservation channel transmissions are distributed non-periodically in a time-frequency domain.

13. The wireless communication device of claim 12, wherein the time-frequency resources available to use for reservation channel transmissions are distributed deterministically within the time-frequency domain.

14. The wireless communication device of claim 10, wherein the first reservation channel transmission comprises at least one of the following: a transmitting device identifier, an intended receiving device identifier, resource location information associated with a future data transmission, and a size of the future data transmission.

15. The wireless communication device of claim 10, wherein the CDMA scheme is one of the following: a direct-spread CDMA (DS-CDMA) scheme, a multicarrier CDMA (MC-CDMA) scheme, and a frequency-hopping CDMA (FH-CDMA) scheme.

16. The wireless communication device of claim 10, wherein the first spreading code is a function of at least one of the following: a transmitting device identifier, and an intended receiving device identifier.

17. The wireless communication device of claim 10, wherein the transmitter is further configured to:
after acquiring a first reserved time-slot for data transmissions, transmit a plurality of data transmissions via the first reserved time-slot.

18. The wireless communication device of claim 10, further comprising:
a receiver configured to receive, from the network, a signal containing information regarding a configuration of reservation channel resources within the reservation channel resource pool.

* * * * *